United States Patent [19]

Nelson et al.

[11] 3,802,874

[45] Apr. 9, 1974

[54] CONSUMABLE WELDING WIRE

[75] Inventors: Edward Crowell Nelson, Short Hills, N.J.; Alfred William Marner, Yorktown Heights, N.Y.

[73] Assignee: Union Carbide Corporation, New York, N.Y.

[22] Filed: Oct. 1, 1971

[21] Appl. No.: 185,865

[52] U.S. Cl. ............................ 75/123 J, 75/123 M
[51] Int. Cl. ...................... C22c 37/00, C22c 39/00
[58] Field of Search ...................... 75/123 J, 123 K

[56] References Cited
UNITED STATES PATENTS

| | | | |
|---|---|---|---|
| 2,631,096 | 3/1953 | Brown | 75/123 J |
| 3,162,751 | 12/1964 | Robbins | 219/137 |
| 2,542,220 | 2/1951 | Urban | 75/123 J |
| 3,140,237 | 12/1938 | Leitner | 75/124 |
| 3,409,016 | 10/1946 | Brown | 75/123 J |
| 2,791,517 | 5/1957 | Becker | 75/123 J |
| 3,249,736 | 5/1966 | Kobayashi | 75/123 M |

*Primary Examiner*—Hyland Bizot
*Attorney, Agent, or Firm*—Domonic J. Terminello

[57] ABSTRACT

A small amount of titanium (0.005-0.015 wt-%) added to a molybdenum containing filler metal significantly increases its notch toughness as measured by Charpy Vee-notch tests.

5 Claims, No Drawings

CONSUMABLE WELDING WIRE

This invention relates to a consumable wire electrode for gas metal-arc welding, and more particularly, to such a wire electrode for welding mild and low alloy steels.

There is a class of intermediate strength steels which have good notch toughness at low temperature. These steels are used in the fabrication of critical structures such as cross country pipe lines and off shore drilling rigs. In order to weld these steels and obtain weld metal which matches the base metal mechanical properties, it has been necessary to use wire electrodes which contain nickel and sometimes chromium. The addition of nickel and/or chromium, of course, adds significantly to the cost of the wire electrode.

It has been discovered that a welding wire containing no nickel or chromium can be made to produce weld metal in intermediate strength steels, having notch toughness properties which match or exceed those of the base plate.

Accordingly, it is an object of this invention to provide a welding wire electrode which produces notch toughness properties which match or exceed those of the base plate and which contain no nickel or chromium as alloying ingredients.

Another object is to provide a welding wire electrode which will produce weld metal which will have a minimum loss of strength while notch toughness is improved even when the weldment is stress-relieved.

It has been found that the above objects can be achieved by a wire electrode having a chemical analysis consisting of the following ingredients in the general range of

| | | |
|---|---|---|
| Carbon (C) 0.07–0.12 | weight | percent |
| Manganese (Mn) 1.60–2.10 | do | do |
| Silicon (Si) 0.50–0.80 | do | do |
| Molybdenum (Mo) 0.40–0.60 | do | do |
| Sulfur (S) 0.035 Max. | do | do |
| Phosphorus (P) 0.025 Max. | do | do |
| Titanium (Ti) 0.005 to 0.015 | do | do |
| Balance Iron | | |

Titanium has been used in high strength low alloy nickel steel wires with or without the addition of chromium to enhance notch toughness properties. Also, titanium in relatively large quantities has been used as a deoxidizer in welding electrode wires. It has now unexpectedly been found that titanium additions of from about 0.005 to 0.015 weight percent in wire compositions containing molybdenum with no nickel or chromium will improve the notch toughness properties of weld metal deposited with such wire, both in the as-welded and stress relieved condition. Titanium additions in quantities much greater than 0.015 will cause deterioration of notch toughness properties due to embrittlement, while quantities of about 0.005 are required in order to achieve some improvement in notch toughness properties. It is preferred, however, that the titanium addition be between 0.005 to 0.01, and specifically about 0.008. In the manufacture of the wire in the steel mills it is sometimes difficult to maintain the titanium addition within specified limits. A titanium addition of about 0.008 has been found to be most beneficial for the purpose of this invention and is the aimed at quantity.

Typical wire compositions of this invention are designated in Table I below as wires B and C. Wire A is a similar composition but with Ti purposely at a very low level.

TABLE I

| A | | B | | C | |
|---|---|---|---|---|---|
| C | 0.09 | C | 0.11 | C | 0.10 |
| Mn | 1.87 | Mn | 1.94 | Mn | 1.90 |
| Si | 0.68 | Si | 0.70 | Si | 0.70 |
| Mo | 0.45 | Mo | 0.50 | Mo | 0.48 |
| S | 0.016 | S | 0.007 | S | 0.010 |
| P | 0.019 | P | 0.016 | P | 0.017 |
| Ti | 0.002 | Ti | 0.008 | Ti | 0.006 |
| Bal | Fe | Bal | Fe | Bal | Fe |

The process by which the wire is deposited may be standard Gas Metal Arc Welding with spray or short circuiting type metal transfer. The shielding gas may be argon with oxygen and/or carbon dioxide additions or welding grade carbon dioxide.

The following examples are provided to illustrate to those skilled in the art the manner of carrying out the present invention and to indicate the improvement in mechanical properties obtainable using the wire of the invention.

EXAMPLE I

In this example, a 1/16 inch diameter wire of composition A was fed through a torch at 272 ipm toward a workpiece composed of ¾ inch A515 intermediate strength steel having a yield strength of approximately 70,000 psi. The arc current was 385 amperes DCRP and the arc voltage was 31½ volts. The plates were placed in a V groove arrangement with a 45° included angle and a root opening of one-half inch with a backing piece of the same material. The weld was made in 15 passes at an average travel speed of 17 ipm. The shielding gas was carbon dioxide at a flow rate of 45 cfh.

The mechanical properties of the deposited weld metal were as follows:

| | |
|---|---|
| Ultimate Tensile Strength | 96,800 psi |
| Yield Strength, 0.2% Offset | 77,600 psi |
| Elongation, % in 2 inches | 21.8% |
| Reduction in Area | 59% |

Notch toughness values as measured by the Charpy Vee Notch test were as follows:

| Temp. | Ft.–Lbs. |
|---|---|
| 0°F. | 15 |
| –20°F | 10 |

EXAMPLE II

In this example, a 1/16 inch diameter wire of composition B was fed through a torch at 282 ipm toward a workpiece composed of A515 intermediate strength steel having a yield strength of about 70,000 psi. The workpiece was about three-fourths inch thick. The arc current and voltage were 400 amperes at 32 volts. The plates were placed in a V groove arrangement with a 45° included angle and a root opening of one-half inch, with a backing piece of the same material. The weld was made in 12 passes at an average travel speed of 17 ipm. The shielding gas was carbon dioxide at 50 cfh.

The mechanical properties of the deposited weld metal were as follows:

| | |
|---|---|
| Ultimate Tensile Strength | 100,300 psi |
| Yield Strength, 0.2% Offset | 88,700 psi |
| Elongation, % in 2 inches. | 24.0% |
| Reduction in Area | 65.3% |

Notch toughness values as measured by the Charpy Vee Notch test, were as follows:

| Temp. | Ft.-Lbs. |
|---|---|
| 0°F. | 77 |
| −20°F. | 68 |
| −50°F. | 62 |
| −75°F. | 54 |
| −100°F. | 40 |

As will be noted, the notch toughness is remarkably increased over that obtained with wire A. A portion of the same weld was stress-relieved at 1125°F. for one hour with the following mechanical properties:

| | |
|---|---|
| Ultimate Tensile Strength | 98,600 psi |
| Yield Strength 0.2% Offset | 88,800 psi |
| Elongation, % in 2 inches | 25.3% |
| Reduction in Area | 65.8% |

Charpy Vee Notch values were as follows:

| Temp. | Ft.-Lbs. |
|---|---|
| 0°F. | 87 |
| −20°F. | 88 |
| −75°F. | 62.5 |
| −100°F. | 44 |

As will be noted, the heat treatment had little effect on the yield and ultimate tensile strengths, while the notch toughness properties were favorably improved.

EXAMPLE III

The welding conditions in this example were the same as Example II, except that wire C was used. The mechanical properties were as follows:

| | |
|---|---|
| Ultimate Tensile Strength | 101,800 psi |
| Yield Strength, 0.2% Offset | 87,400 psi |
| Elongation, % in 2 inches | 21.9% |
| Reduction in Area | 57.6% |

Charpy Vee Notch Values were as follows:

| Temp. | Ft.-Lbs. |
|---|---|
| 0°F. | 60 |
| −20°F. | 50 |
| −50°F. | 40 |
| −75°F. | 38 |
| −100°F. | 24 |

As will be noted, the notch toughness properties obtained with a wire containing 0.006 wt.-% Ti were slightly lower than those obtained with a wire containing 0.008 wt.-% Ti.

EXAMPLE IV

In this example, wire composition B was used with 98 percent argon, plus 2 percent oxygen as the shielding gas. The wire was 1/16 inch diameter. Wire feed speed was 184 ipm. The arc current was 330 amps and the arc voltage was 25 volts. The base plate and joint configuration were the same as Example II. The weld was made in 15 passes at 12 ipm. Mechanical properties were as follows:

| | |
|---|---|
| Ultimate Tensile Strength | 109,500 psi |
| Yield Strength, 0.2% Offset | 101,600 psi |
| Elongation, % in 2 inches | 25.9% |
| Reduction in Area | 64.9% |

Charpy Vee Notch Values were as follows:

| Temp. | Ft.-Lbs. |
|---|---|
| 0°F | — |
| −20°F. | — |
| −50°F. | 100 |
| −75°F. | 76.5 |
| −100°F. | 38 |
| −150°F. | 17 |

It will be noted that higher notch toughness properties were achieved with 98% argon plus 2% oxygen shielding gas than with carbon dioxide.

EXAMPLE V

In this example, everything remained the same as in Example IV, except wire C was used.
The properties were as follows:

| | |
|---|---|
| Ultimate Tensile Strength | 107,100 psi |
| Yield Strength, 0.2% Offset | 97,000 psi |
| Elongation, % in 2 inches | 25.5% |
| Reduction in Area | 69.3% |

Charpy Vee Notch Values were as follows:

| Temp. | Ft.-Lbs. |
|---|---|
| 0°F. | 67.5 |
| −20°F. | 44 |
| −50°F. | 45.4 |
| −75°F. | 50 |
| −100°F. | 24 |

Again, the wire containing 0.006% Ti produced slightly lower notch toughness values than the wire containing 0.008% Ti but still significantly better than the wire containing 0.002% Ti as illustrated in Example I.

It is postulated that a titanium addition of about 0.008 percent to about 0.01 percent to the basic wire composition of this invention will modify the weld metal grain structure to produce exceptional mechanical properties.

Having described the invention with respect to preferred embodiments, it should be understood that minor modifications may be made to the compositions without departing from the spirit and scope of the invention.

What is claimed is:

1. A consumable ferritic welding wire for gas metal arc welding consisting of in weight percent:
Carbon 0.07 – 0.12
Manganese 1.60 – 2.10
Silicon 0.50 – 0.80

Molybdenum 0.40 – 0.60
Sulfur 0.035 max.
Phosphorus 0.025 max.
Titanium 0.005 – 0.015
Balance Iron 2. Wire according to claim 1 wherein titanium is 0.005 to 0.01 weight percent.

3. Wire according to claim 1 wherein titanium is about 0.008 weight percent.

4. A consumable ferritic welding wire for gas metal arc welding consisting of in weight percent:
Carbon 0.11
Manganese 1.94
Silicon 0.70
Molybdenum 0.50
Sulfur 0.007
Phosphorus 0.016
Titanium 0.008
Balance Iron 5. A consumable ferritic welding wire for gas metal arc welding consisting of in weight percent:
Carbon 0.10
Manganese 1.90
Silicon 0.70
Molybdenum 0.48
Sulfur 0.010
Phosphorus 0.017
Titanium 0.006
Balance Iron

* * * * *